United States Patent [19]

Sasaki et al.

[11] Patent Number: 5,121,481
[45] Date of Patent: Jun. 9, 1992

[54] TEXT (WORD PROCESSOR) HAVING RIGHT END JUSTIFIED VARIABLE SIZE DISPLAY AREA FOR INFORMATION RELATED TO INPUT DATA

[75] Inventors: Ryoichi Sasaki; Toshiyuki Sakai, both of Nagoya; Hajime Kumazawa, Ichinomiya, all of Japan

[73] Assignee: Brother Kogyo Kabushiki Kaisha, Aichi, Japan

[21] Appl. No.: 475,711

[22] Filed: Feb. 6, 1990

Related U.S. Application Data

[63] Continuation of Ser. No. 136,362, Dec. 22, 1987, abandoned.

[30] Foreign Application Priority Data

Dec. 24, 1986 [JP] Japan .................. 61-313654

[51] Int. Cl.⁵ .................. G06F 3/14; G06F 15/40
[52] U.S. Cl. .................. 395/275; 364/225.6;
364/226.1; 364/236; 364/237.2; 364/282.1;
364/927.2; 364/936; 364/975; 364/943;
364/943.42; 364/943.43; 364/419; 364/139;
364/DIG. 2
[58] Field of Search .................. 364/200 MS, 900 MS,
364/521, 518, 419

[56] References Cited

U.S. PATENT DOCUMENTS

| 4,373,192 | 2/1983  | Yanagiuchi et al. | 340/792 X |
|-----------|---------|-------------------|-----------|
| 4,408,302 | 10/1983 | Fessel et al.     | 364/900   |
| 4,439,838 | 3/1984  | Klingenberg       | 364/900   |
| 4,481,603 | 11/1984 | McCaskill et al.  | 364/900   |
| 4,504,825 | 3/1985  | Bergermann        | 400/83 X  |
| 4,559,615 | 12/1985 | Goo et al.        | 364/900   |
| 4,661,000 | 4/1987  | Shinbori          | 400/83    |
| 4,775,251 | 10/1988 | Suzuki et al.     | 400/63    |
| 4,783,758 | 11/1988 | Kucera            | 364/900   |
| 4,783,759 | 11/1988 | Borgendale et al. | 364/900   |
| 4,789,962 | 12/1988 | Berry et al.      | 364/900   |

*Primary Examiner*—Thomas C. Lee
*Assistant Examiner*—Ayni Mohamed
*Attorney, Agent, or Firm*—Kane, Dalsimer, Sullivan, Kurucz, Levy, Eisele and Richard

[57] ABSTRACT

A data processing system having a relational data memory device for storing data relational to the data to be input through an input device, and a retrieval device for the relational data.

The system further has a detecting device for detecting a quantity of the retrieved relational data, and relational data display control device for visually representing the retrieved relational data on the display device while fluctuating the relational data display area on the display device in accordance with the quantity of the retrieved relational data detected by the detecting device.

With the thus constituted system, when visually representing the retrieved relational data on the display device, the display utilization efficiency as well as the operational facility is enhanced as the display area for the relational data is fluctuated in accordance with the quantity thereof.

10 Claims, 7 Drawing Sheets

I HAVE NO DOUBTS WHATEVER OF THAT.

FIG. 4 (b)

I [HAVE] NO DOUBTS ① HOLD ② POSSESS ③ OWN ④ CONTAIN ⑤ WEAR ⑥ ENJOY ⑦ TAKE ⑧ RECEIVE

FIG. 4 (c)

I HAVE NO [DOUBTS] WHATEVER OF THAT. ① MISGIVINGS ② SUSPICION ③ DREAD

TEXT (WORD PROCESSOR) HAVING RIGHT END JUSTIFIED VARIABLE SIZE DISPLAY AREA FOR INFORMATION RELATED TO INPUT DATA

This is a continuation of copending application Ser. No. 136,362, filed on Dec. 22, 1987 now abandoned.

BACKGROUND OF THE INVENTION

This invention relates to a data processing system and, more particularly, to a data processing system capable of retrieving relational data from a relational data memory and visually representing the retrieved data on a display unit.

In the data processing system such as electronic typewriters or word processors executing a spelling check function and/or a synonym retrieval function, it is customary that a proper candidate or synonym for an input word is visually represented in a fixed area on a display unit. However, depending on the input word, there exist great differences among the quantities of relational data to be displayed. Therefore, the data processing system of this type is conventionally so contrived that, when the data is great in quantity and cannot be completely represented within the fixed display area, generally the display screen is scrolled or switched by manipulating a cursor key or the like, which raising a problem of intricate operation.

On the other hand, there are also known some data processing system equipped with a liquid crystal or CRT display unit having a sufficiently large display area. With the data processing system of this type, however, when the data is merely small in quantity, a wide blank region is inevitable on the display screen without effective use, and consequently the edit screen area is rendered smaller to deteriorate the display utilization efficiency.

SUMMARY OF THE INVENTION

It is therefore an object of the invention to provide an improved data processing system capable of enhancing, when visually representing the retrieved relational data on the display unit, the display utilization efficiency as well as the operational facility by fluctuating the display area for the relational data in accordance with the quantity thereof.

For the above purpose, in accordance with the invention, there is provided a data processing system comprising: input device for inputting data of characters and symbols; display device for visually representing the input data; relational data memory device for storing data relational to the data to be input through said input device; retrieval device for retrieving the data relational to the input data in said relational data memory device; detecting device for detecting a quantity of said retrived relational data; and relational data display control device for visually representing the retrieved relational data on said display device while fluctuating the relational data display area on said display device in accordance with the quantity of the retrieved relational data detected by said detecting device, the input data being represented only the remaining area on said display device when said relational data is represented on said display device.

With the above constructed data processing system visually represented on the display device, and relational data corresponding to the input data is retrieved from the relational data memory device by the retrieval device. In response to retrieval of the relational data by the retrieval device, the relational data display control device visually represents the relational data on the display device. In this stage, the relational data display area on the display device is fluctuated in conformity with the quantity of the retrieved relational data detected by the detecting device. Thus, it becomes possible to reduce a blank area on the display screen in case of a small data quantity and further to avert intricate manipulation that may otherwise be induced due to scroll and so forth when the data to be displayed is great in quantity. As a result, the edit screen area can be widened to eventually enhance the display utilization efficiency as well as the operational facility of the data processing system.

DESCRIPTION OF THE PREFERRED EMBODIMENTS

Figure 1:
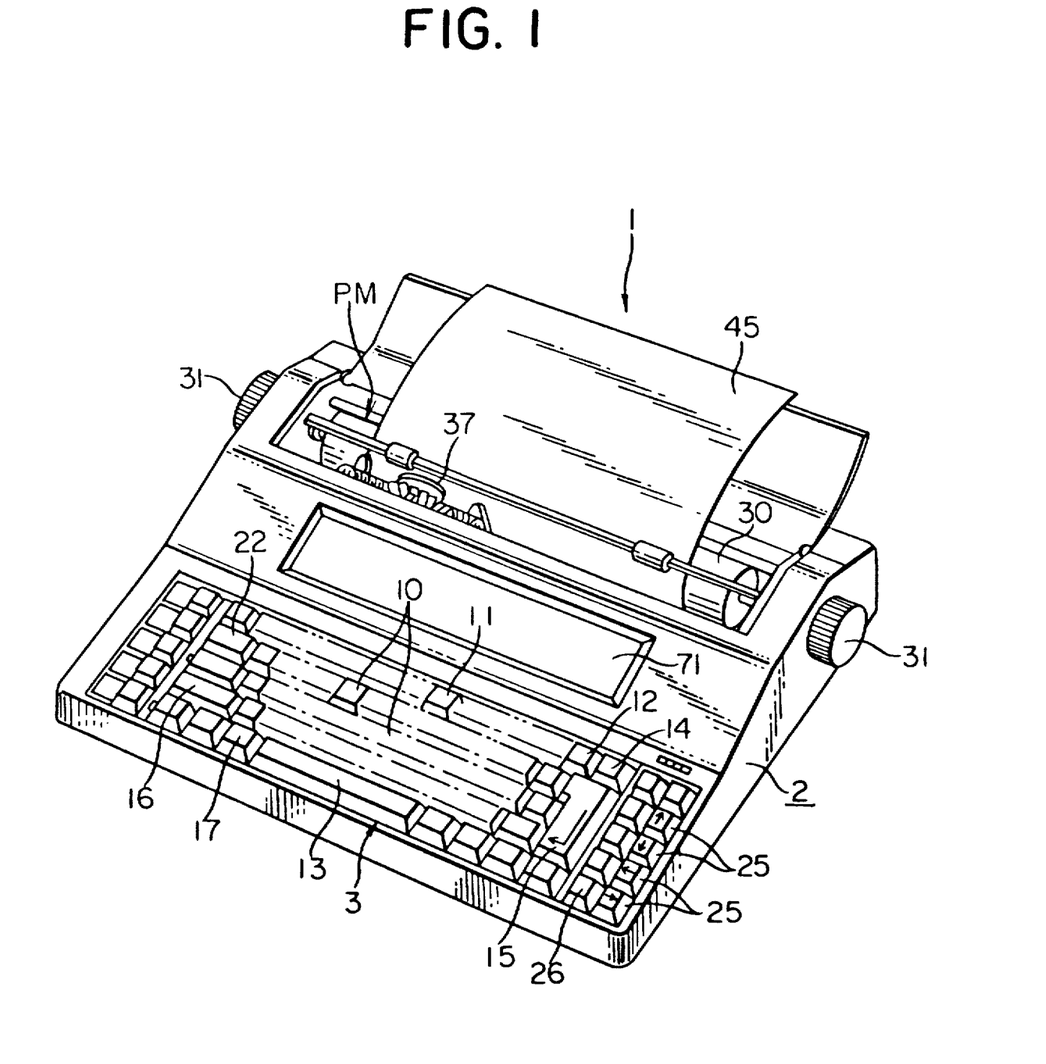
FIG. 1 is a perspective view of an electronic typewriter embodying the invention.

Illustrated in FIG. 1 is an electronic typewriter embodying the invention wherein a keyboard 3 is disposed at a front side of a body frame 2 of an electronic typewriter 1, and a print mechanism PM is incorporated in the frame 2 behind the keyboard 3.

The keyboard 3 is furnished with various keys such as alphanumeric keys including alphabet keys 10, numeral keys 11 and symbol keys 12; a space key 13, a backspace key 14, a return key 15, a shift key 16, a code key 17, cursor move keys 25, a thesaurus key 26 and so forth. The thesaurus key 26 is used for instructing start of a synonym retrieval control. Since the other keys and both the functions and operations thereof are substantially the same as those in the conventional typewriters, explanation therefor is omitted.

In a rear portion of the keyboard 3, there is disposed a LCD (liquid crystal display) 71 which visually represents input characters and symbols with a capacity of 2 lines and 40 digits.

In the print mechanism PM, a platen 30 is actuated by a platen drive motor, not shown in FIG. 1, or a platen knob 31 to feed a print sheet 45. A carriage 37 furnished with a print device such as a type wheel is so disposed as to be driven along the platen 30.

Now the entire constitution of a control system in the typewriter 1 will be described with reference to a block diagram of FIG. 3.

Figure 2:
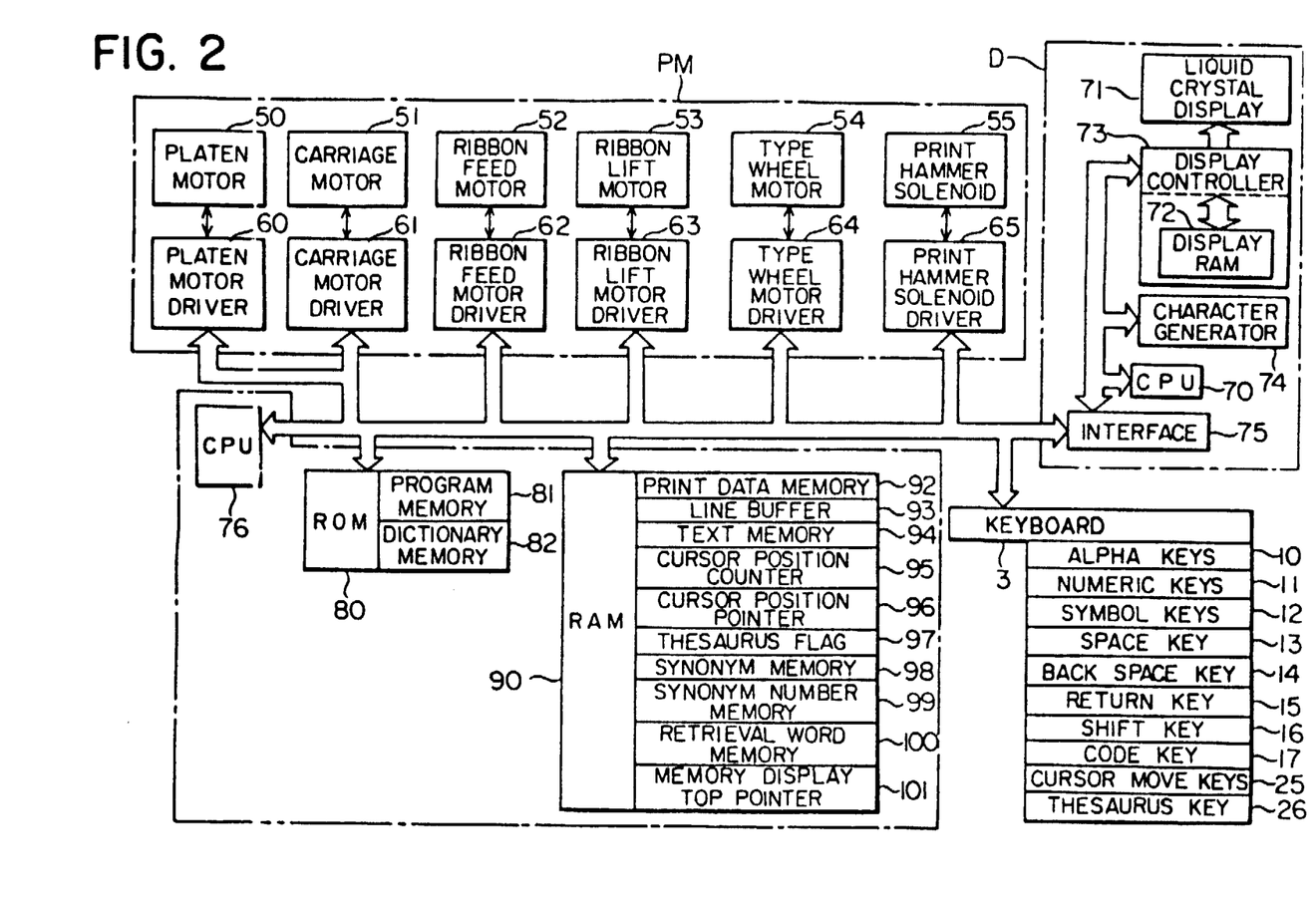
FIG. 2 is a block diagram of a control system in the electronic typewriter.

A drive unit of the print mechanism PM comprises a platen motor 50 and its driver 60, a carriage motor 51 and its driver 61, a ribbon feed motor 52 and its driver 62, a ribbon lift motor 53 and its driver 63, a type wheel motor 54 and its driver 64, a print hammer solenoid 55 and its driver 65. The drivers 60 through 65 in the print mechanism PM are connected respectively to a control unit C.

The display unit D comprises a display control CPU (central processing unit) 70; the LCD 71 for visually representing characters and symbols thereon with a capacity of 2 lines and 40 digits; a display RAM (random access memory) unit 72 including a display RAM to store display data correspondingly to individual display position and an attribute display RAM to store an inversion indicating bit and so forth; a display controller 73 incorporating the display RAM unit 72 therein; a character generator 74 for storing display dot patterns correspondingly to code data such as characters and symbols; and an interface 75. The display CPU 70 reads out from the character generator 74 the display pattern data corresponding to the command data or character code data outputted from a main CPU 76 via the interface 75 and feeds the pattern data to the display controller 73. The display controller 73 writes the pattern data in the display RAM 72 while outputting to the LCD 71 the display signal which corresponds to such pattern data.

The control unit C comprises a main CPU 76, a ROM (read only memory) 80 and a RAM 90 connected respectively to the main CPU 76. The keyboard 3, the drivers 60-65 and the interface 75 are also connected to the main CPU 76 via data bus and so forth.

In a program memory 81 of the ROM 80, there are stored general control programs for controlling the print mechanism PM and the display unit D in accordance with the data of characters, symbols and so forth inputted through the keyboard 3 and also with the data of individual functions inputted through the function keys. Besides the above, in the program memory 81 further stored is a particular control program to execute specific control of the present invention as will be described in detail later. In a dictionary memory 82 of the ROM 80, there are stored data of, e.g. 70,000 words (inclusive of spellings, parts of speech, meanings, conjugations and synonyms) which are arranged alphabetically as in any ordinary dictionary.

The RAM 90 includes, in addition to various memories for temporarily storing the results of computation in the main CPU 76, a print data memory 92 for storing print data correspondingly to print positions in a typewriter mode, a line buffer 93 having a capacity equivalent to the total number of characters and symbols visually representable on the LCD 71 in a memory mode and capable of storing the data of characters and symbols being displayed; a text memory 94 for storing the input data as file data, a cursor position counter 95 for counting the position of a cursor on the LCD 71, a cursor position pointer 96 for indicating the address of the line buffer 93 in accordance with the value of the cursor position counter 95, a thesaurus flag 97 for indicating a synonym retrieval process, a synonym memory 98 for storing the entire synonyms retrieved; a synonym number memory 99 for designating a required synonym out of the entire retrieved synonyms; a retrieval word memory 100 for storing words relative to retrieval of synonyms; and a memory display top pointer 101 for indicating an address on the text memory 94 corresponding to the top display data on the LCD 71.

In a typewriter mode, the main CPU 76 actuates the print mechanism PM in accordance with a control program to print the input data of characters and symbols from the keyboard 3 on the print sheet 45, and then sequentially stores the printed data in the print data memory 92 correspondingly to the print positions. And in a memory mode, the main CPU 76 writes the input data of characters and symbols from the keyboard 3 in the text memory 94 via the line buffer 93 in accordance with the control program, and simultaneously outputs the data of the line buffer 93 to the display CPU 70 of the display unit D while controlling the cursor display position. When command data for actuating the motors of the print mechanism PM are inputted from the related function keys, the main CPU 76 outputs to the drivers 60-65 the control data corresponding to the input data in accordance with the control program. Furthermore, the following control is executed for spelling check of each input word and retrieval of synonyms thereof.

The control flow chart of the data processing system as above constituted will now be described below with reference to FIGS. 3(a) through 3(e). For convenience of explanation, a description will be given with regard to the control in a memory mode.

Figure 3A:
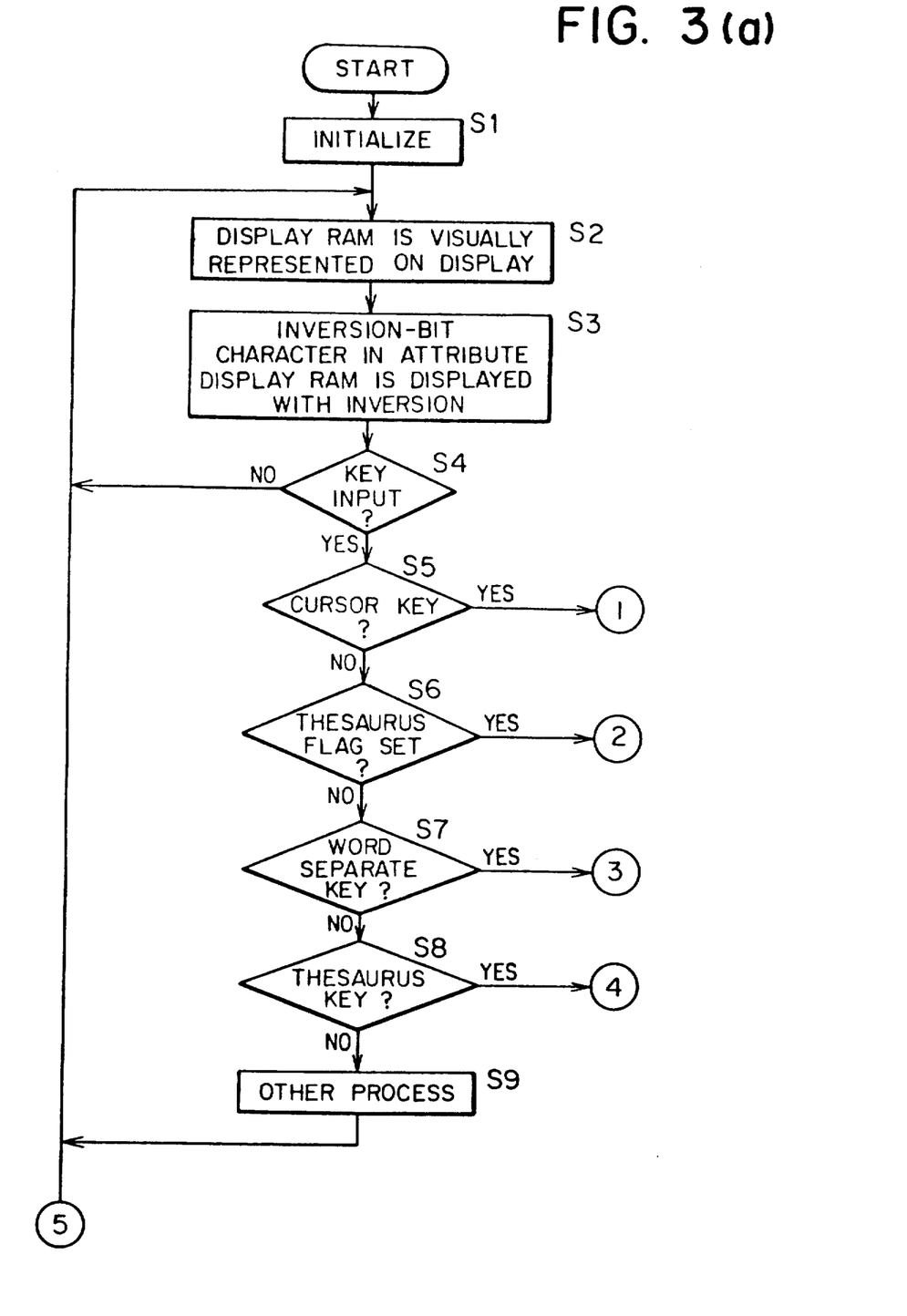
FIGS. 3(a),3(b), 3(c), 3(d), and 3(e) are flow charts of control routines.
Figure 3B:
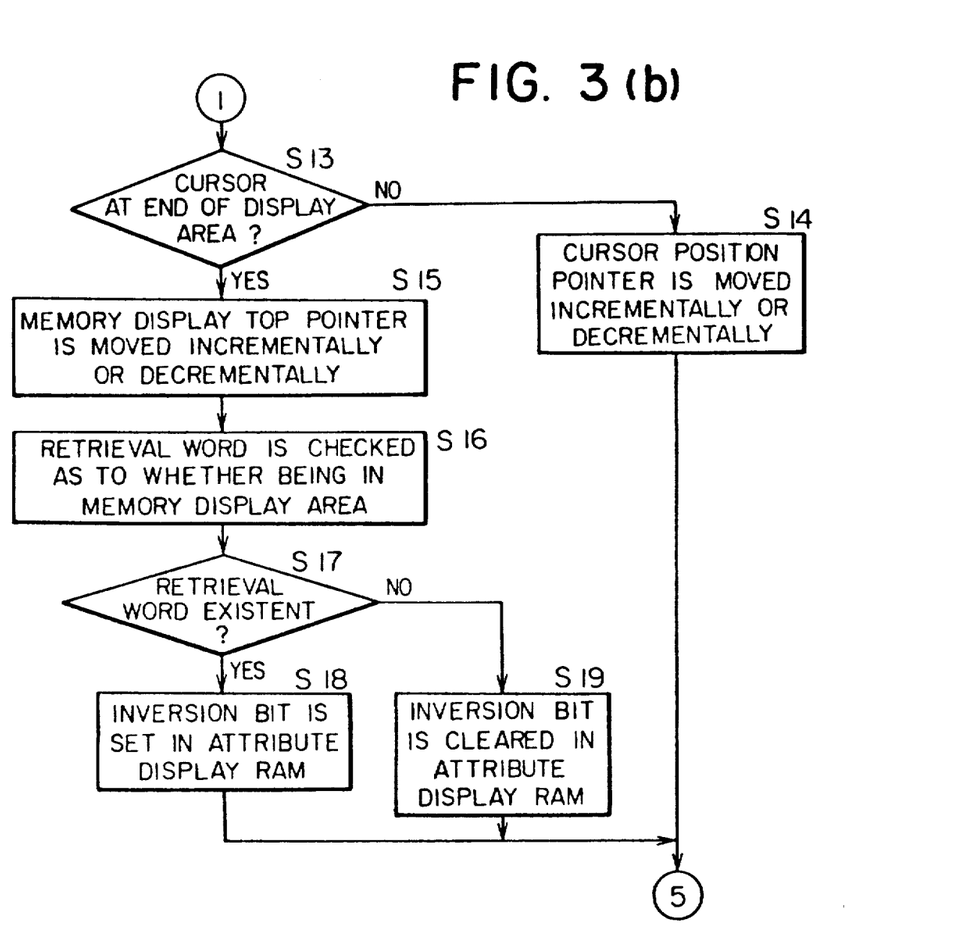
Figure 3C:
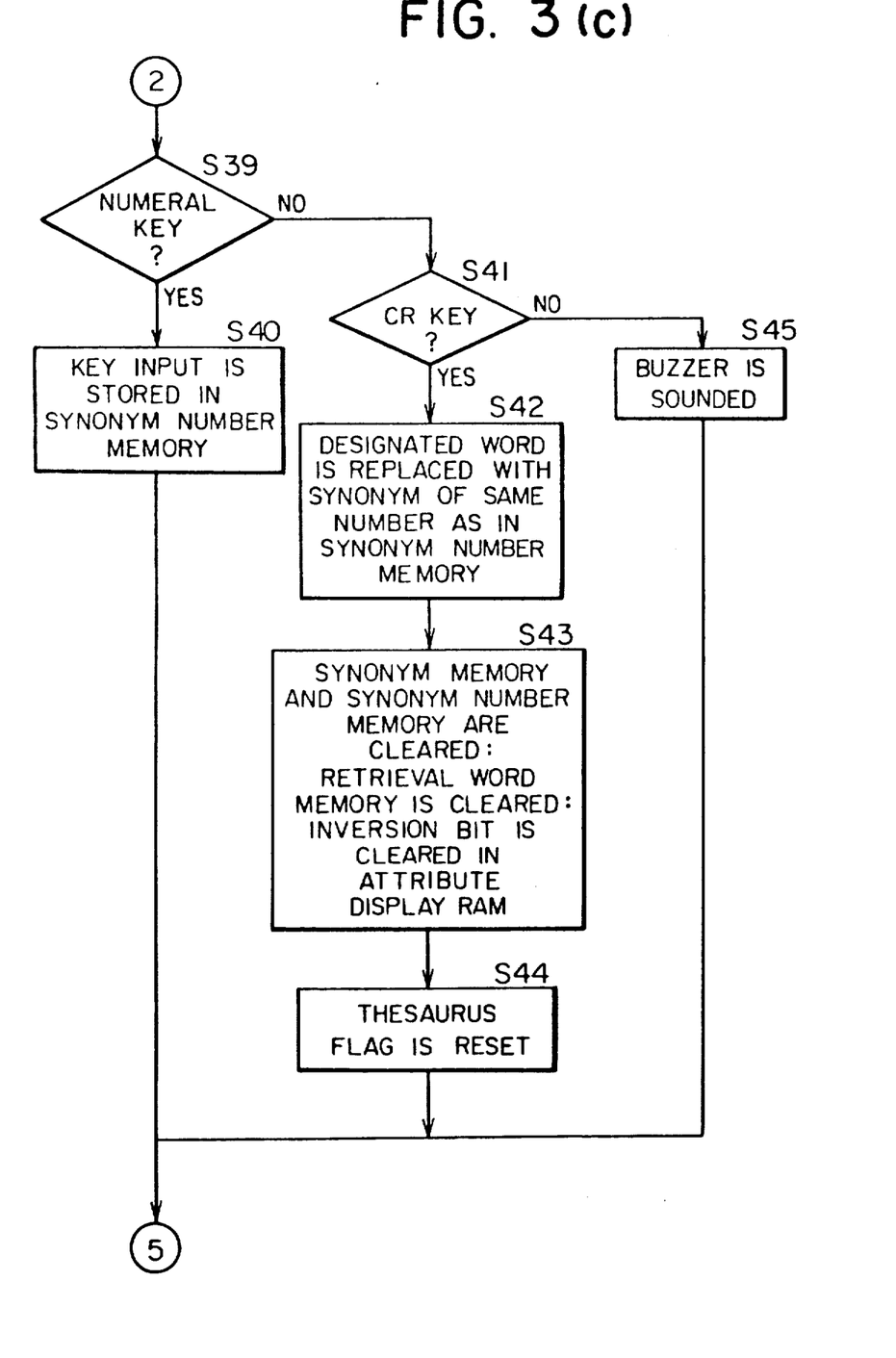

In FIG. 3(a), the control is started when the typewriter is switched on. First in step S1 (hereinafter referred to simply as "S1", and other steps mentioned similarly), the control program stored in the program memory 81 is read out by the main CPU 76, and an under-mentioned thesaurus flag 97 is reset. After initialization such as clearing the synonym memory 98, the synonym number memory 99 and the retrieval word memory 100, the procedure advances to S2. In S2, the data in the display RAM of the display unit D is visually represented on the LCD 71. However, in the initial state where no data is stored in the display RAM, nothing is visually represented on the LCD 71. Next in S3, the data in the attribute display RAM of the display unit D is visually represented on the LCD 71. However, since none of the display data is stored in the attribute display RAM in the initial state, nothing is visually represented on the LCD 71. The procedure advances to S4 after completion of the process in S3. Next in S4, a key input is waited and the processes of S2 through S4 are repeated until a key input is entered.

In response to any key input, the procedure advances to S5 where a decision is made as to whether the input is a depression of the cursor key 25. If the result is not a depression of the cursor key 25, the procedure advances to S6 for deciding whether the thesaurus flag 97 is set or not. Since the thesaurus flag 97 is reset in the initial state, the procedure advances to S7 for deciding whether the input is from any of word separate keys (those for instructing space, comma, period or the like). If the input key is not any of such word separate keys, the procedure advances to S8 for deciding whether the input is from the thesaurus key 26 or not. If not, the procedure advances to S9.

In S9, the same process as in any ordinary typewriter is executed in response to the instruction from the input key. For example, the data corresponding to the input character or symbol is written in both the line buffer 93 and the text memory 94 of the RAM 90, and simultaneously the data in the line buffer 93 is outputted to the display CPU70 of the display unit D. After completion of the process in S9, the control procedure returns to S4 through the processes in S2 and S3. When any data is existent in the line buffer 93, visual representation of the data in the line buffer 93 is performed on the LCD 71 with the processes in S2 and S3.

Figure 3D:
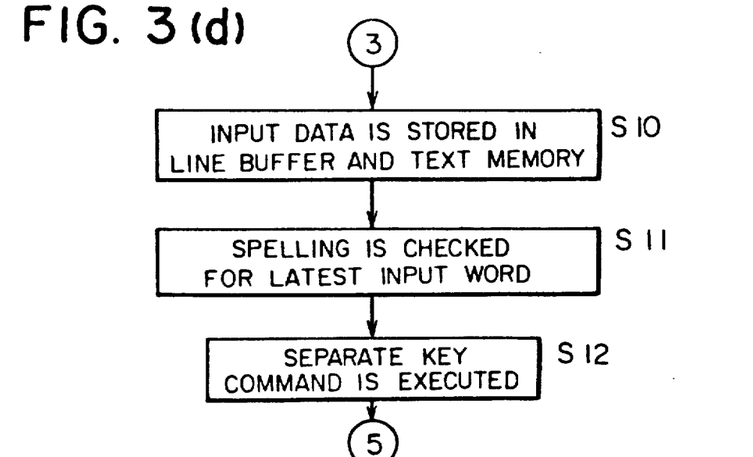

When the input is from any word separate key, the control procedure advances from S7 and S10 shown in FIG. 3(d). In S10, the input data from the word separate key is written in both the line buffer 93 and the text memory 94. Next in S11, a spelling check is executed with regard to the latest input word entered. Upon completion of the process in S11, the procedure advances to S12 for executing control relative to the depressed word separate key such as space key and then returns to S4 through the processes of S2 and S3 in FIG. 4(a).

In retrieving synonyms of the input word, first the cursor is moved by depressing the cursor key 25 so that the cursor on the LCD 71 is placed at the word of which synonyms are to be retrieved. Upon depression of the cursor key 25, the control procedure advances from S5 to S13 in FIG. 3(b). In S13, a decision is made as to whether the cursor on the LCD 71 is at the end (right or left) of the display range with respect to the direction of the cursor movement. If the cursor is not at the end of the display range, the procedure advances to S14 for moving the cursor position pointer 96 incrementally or decrementally in the direction indicated by the cursor key 25. Subsequently the procedure returns to S4 through the processes of S2 and S3 in FIG. 3(a). In this stage, the position of the cursor moved in response to the input key is displayed on the LCD 71 with the processes of S2 and S3.

When the cursor on the LCD 71 is decided to be at the end of the display range in S13, the procedure advances to S15 for moving the memory display top pointer 101 incrementally or decrementally opposite to the direction indicated by the cursor key 25. Simultaneusly the data in the line buffer 93 is renewed in accordance with such incremental or decremental movement. Next in S16, a check is executed as to whether an under-mentioned retrieval word is existent or not in the memory display area on the LCD 71 where the data in the text memory 94 is visually represented. Since any retrieval word is not yet designated in this stage, there exists no retrieval word in the retrieval word memory 100. Consequently the result of the decision in S17 becomes No with regard to the existence of any retrieval word in the memory display area. In case the result of such decision in S17 is Yes, the procedure advances to S18 for setting an inversion indicating bit for the retrieval word in the attribute display RAM. Meanwhile, when the result of the decision in S17 is No, the procedure advances to S19 for clearing the inversion indicating bit for the retrieval word in the attribute display RAM. Since in this stage none of the inversion indicating bit for the retrieval word is existent in the attribute display RAM, the process in S19 is invalid and therefore the procedure returns to S4 through S2 and S3 in FIG. 3(a). Based on the processes in S2 and S3, there is visually represented on the LCD 71 the shift of the data in the text memory 94 opposite to the direction indicated by the input key.

With the processes in S13-S15, the cursor on the LCD 71 is positioned at the word of which synonyms are to be retrieved, and then the thesaurus key 26 is inputted. Subsequently the control procedure advances to S20 in FIG. 3(e) for starting retrieval of the synonyms.

In S20, a decision is made as to whether any word is existent or not at the cursor position. In case the cursor is not placed at the word previously on the display 71, the result of the decision becomes No so that the procedure advances to S21 for sounding a buzzer and then returns to S2 in FIG. 3 (a). If the existence of the word at the cursor position is decided in S20, the result becomes Yes and then the procedure advances to S22 for retrieving the synonyms in the dictionary memory 82 with regard to the word in the line buffer 93 designated by the cursor. Next in S23, a decision is made as to whether any synonym is existent or not with regard to the designated word. When no synonym is existent, the procedure advances to S24 for setting in the display RAM the data indicating that no synonym is existent, and then returns to S2 in FIG. 3(a). If any synonym is judged to be existent in S23, the procedure advances to S25 for setting the thesaurus flag 97. Thereafter, the process particular to the synonym retrieval is executed during the set time of the thesaurus flag 97. Next in S26, the data of the entire detected synonyms are stored in the synonym memory 98, and then the procedure advances to S27 for storing the retrieval word in the memory 100.

Figure 3E:
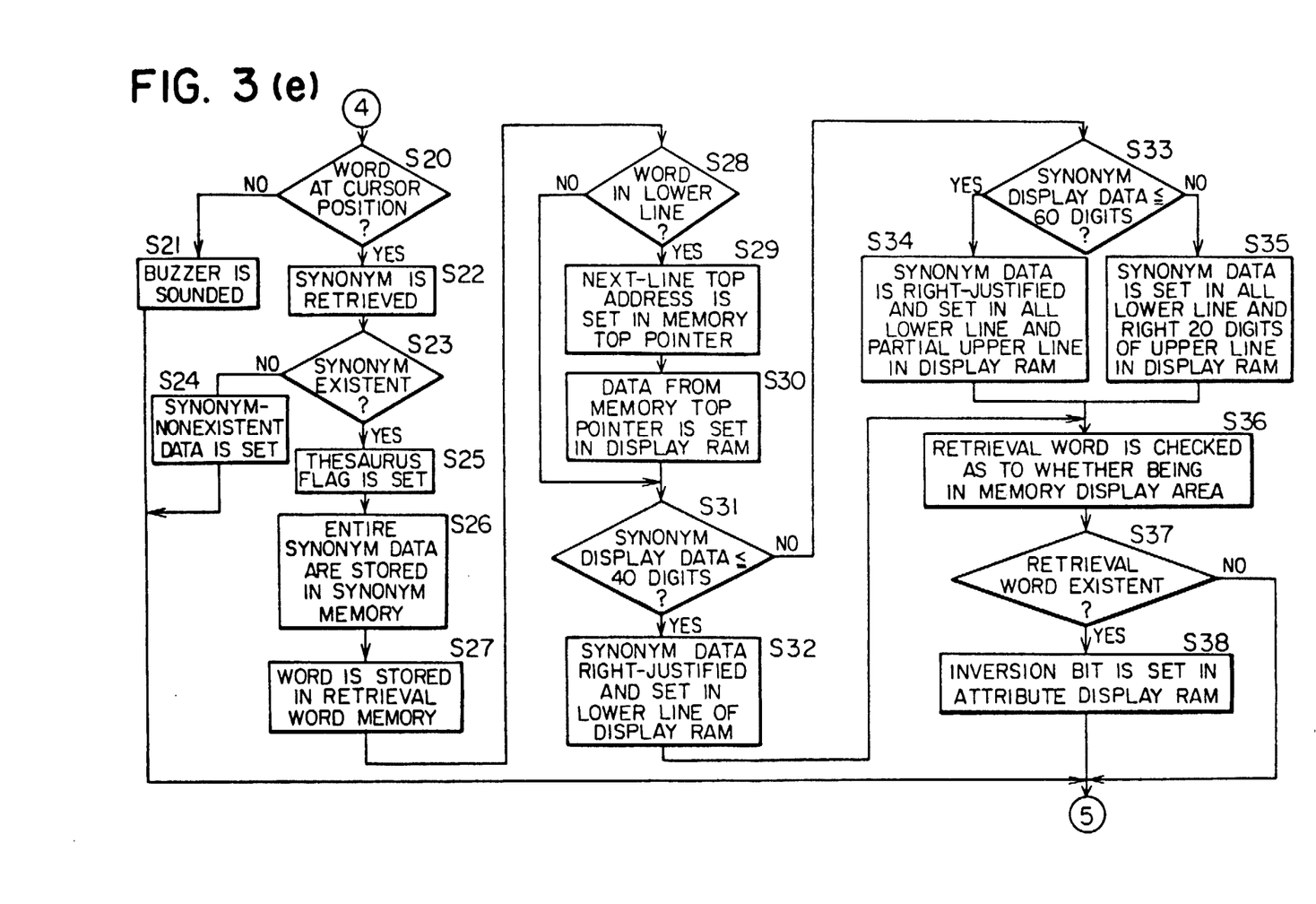

In S28, a decision is made as to whether the retrieval word is existent or not in the line buffer 93, i.e. in the lower line on the LCD 71. If the word is decided to be in the lower line, the procedure advances to S29 for setting the next-line top address in the memory display top pointer 101 so as to shift the display data to the next line in the text memory 94. Further in S30, sequential data continuous with the address in the memory display top pointer 101 are set in the display RAM. Upon completion of the process in S30, the procedure advances to S31. In S28, if the retrieval word is decided to exist in the upper line and not in the lower line on the LCD 71, the visual representation need not be shifted and therefore the procedure advances directly to S31.

In S31, a decision is made as to whether the synonym display data in the synonym memory 98 is less or not than 40 digits corresponding to one line on the LCD 71. And if such data is less than 40 digits, the procedure advances to S32 for setting the synonym data while right-justifying the same in the lower line of the display RAM and further advances to S36. Meanwhile, in case the synonym display data in the synonym memory 98 is more than 40 digits, the procedure advances to S33 for deciding whether the synonym display data is less or not than 60 digits. And if such data is less than 60 digits, the procedure advances to S34 for setting the synonym data while right-justifying the same in the entirety of the lower line and a right portion of the upper line of the display RAM, and further advances to S36. In case the synonym display data is decided to be more than 60 digits in S33, the procedure advances to S35 for setting the synonym data while right-justifying the same in the entirety of the lower line and a right portion (20 digits) of the upper line of the display RAM, and further advances to S36. The partial synonym data not displayed in S35 is discarded since the use frequency thereof is generally low. However, the process may be so modified as to scroll the visual representation of the synonym data in such a manner that nay synonym of a low use frequency can be selected.

In S36, a check is executed as to whether the retrieval word is included or not in the retrieval word memory 100 within the memory display area which is not hidden on the LCD 71 by the visual representation of the synonym data. Next in S37, a decision is made as to whether the retrieval word is within the memory display area or not. If the retrieval word is within the memory display area, the procedure advances to S38 for setting an inversion indicating bit in the attribute display RAM with regard to the retrieval word and then returns to S4 through the processes of S2 and S3. Meanwhile, if the retrieval word is decided not to be within the memory display area in S37, the procedure returns to S4 through the processes of S2 and S3 in FIG. 3(a).

Thus, when the synonym data is small in quantity, it is visually represented while being right-justified in the lower line on the LCD 71, and the data in the text memory 94 is visually represented in the remaining memory display area. In case the synonym data is great in quantity, it is visually represented in a right portion of the upper line and the entirety of the lower line on the LCD 71, and the data in the text memory 94 is visually represented in the remaining memory display area. If the retrieval word is existent in the memory display area where the data in the text memory 94 is visually represented, the retrieval word is represented with an inversion indicating bit on the LCD 71. Due to the control procedure mentioned above, it becomes possible to reduce the blank area on the display screen when the synonym content to be visually represented is small in quantity, and further to avert any operation complication that may otherwise be caused by screen scroll and so forth in the case of a great content. The synonym data is displayed in such a manner that serial numbers coincident with the sequence in the synonym memory 98 are added to the individual synonyms.

In order to determine adoption of one of the entire synonyms detected, the user inputs one of the serial numbers to designate a required synonym. Anterior to such process, in case the retrieval word is not existent within the memory display area, the retrieval word is visually represented on the LCD 71 by depressing the cursor key 25. Then the control procedure advances from S5 to S13 in FIG. 3(b). Although the processes of S13-S16 are the same as those mentioned, the determined display range is, out of the entire area on the LCD 71, the memory display area not in use for visual representation of the synonym data. When the retrieval word is entered into the memory display area by depression of the cursor key 25, the result of the decision in S17 becomes Yes so that the procedure advances to S18, where an inversion indicating bit for the retrieval word is set in the attribute display RAM. When the retrieval word is moved out of the memory display area by depression of the cursor key 25, the result of the decision in S17 becomes No so that the procedure advances to S19, where the inversion indicating bit for the retrieval word is cleared in the attribute display RAM. After completion of the processes in S18 and S19, the procedure returns to S4 through S2 and S3 in FIG. 3(a). Based on the processes in S2 and S3, the display data is visually represented on the LCD 71 with a shift opposite to the direction indicated by the cursor key 25, and simultaneously the retrieval word is displayed with an inversion indicating bit.

Subsequently, in order to determine adoption of one of the entire synonyms detected, the user inputs one of the displayed serial numbers to designate a required synonym. Upon depression of the corresponding numeral key 11 with the thesaurus flag 97 set, the control procedure advances from S6 to S39 in FIG. 3(c). Since the input is from the numeral key 11, the result of the decision in S39 becomes Yes so that the procedure advances to S40 for storing the input numeral in the synonym number memory 99 and then returns to S2 in FIG. 3(a). In case the required synonym has a number of two digits, the corresponding numeral key 11 is depressed again, whereby the two-digit numeral is stored in the synonym number memory 99 with the processes of S39 and S40 in FIG. 3(c), and the procedure returns to S2 in FIG. 3(a). After the required synonym is designated by inputting one of the serial numbers, the return key 15 is depressed. Then the control procedure advances to S41 through S6 and S39. Due to depression of the return key 15, the result of the decision in S41 becomes Yes so that the procedure advances to S42. In this step, the synonym designated by the number stored in the synonym number memory 99 is read out from the synonym memory 98, and the word in the line buffer 93 and the text memory 94 corresponding to the word in the retrieval word memory 100 is replaced with the read synonym. And the data thus replaced in the line buffer 93 is set in the display RAM 72 of the display unit D. In case no serial number is designated, the contents of the line buffer 93 and the text memory 94 are not replaced. Upon completion of the process in S42, the procedure advances to S43 for clearing the synonym memory 98 and the synonym number memory 99, then clearing the retrieval word memory 100, and further clearing the inversion indicating bit in the attribute display RAM. After resetting the thesaurus flag 97 in S44, the procedure returns to S4 through the processes of S2 and S3 in FIG. 3(a). As a result of the processes in S2 and S3, merely the input data except the synonym data is visually represented. The inversion indicating bit for the retrieval word is no longer displayed, and the synonym selected instead of the retrieval word is displayed at its position. When any key other than the numeral key 11 and the return key 15 is inputted in the processes of FIG. 3(c), the results of the decisions in S39 and S41 become No, so that the procedure advances to S45 for sounding the buzzer and then returns to S2 in FIG. 3(a).

Hereinafter more specific control in this system will be described with reference to the example of FIG. 5.

Figure 4A:
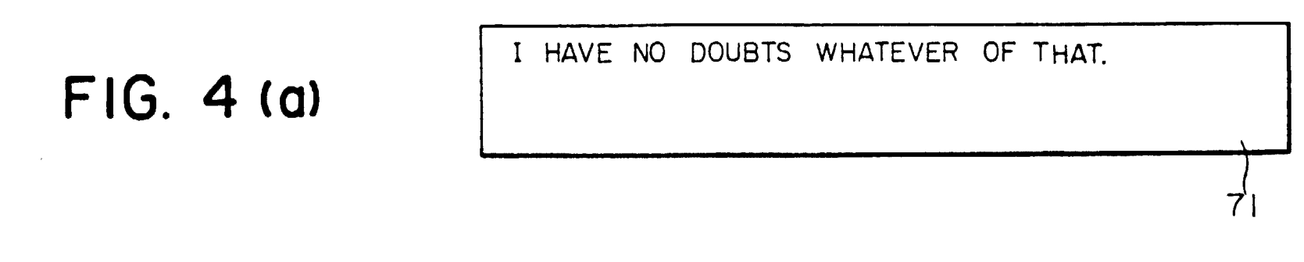
FIGS. 4(a), 4(b), and 4(c) illustrate how visual representation is fluctuated on a display.

Suppose now that a sentence has already been inputted as shown in FIG. 4(a). This stage is posterior to the spelling check control of S10–S12 in FIG. 3(d).

First, for retrieval of synonyms with regard to "have", the selected cursor key 25 is depressed to place the cursor, not shown, at the position of "have" (S5, S13-S19). And when the thesaurus key 26 is inputted, the process of synonym retrieval is executed (S8, S20-S38).

After arrival of the control procedure at S28 where "have" is decided to be in the upper line, the procedure advances therefrom to S31. Synonyms of "have" are more than 40 digits but less than 60 digits as will be described later, and the display position of "have" is within the memory display area not hidden by the visual representation of synonyms, so that the control procedure advances from S2 and S3 to S4 in FIG. 3(a) through S31, S33, S34, S36, S37 and S38.

Figure 4B:
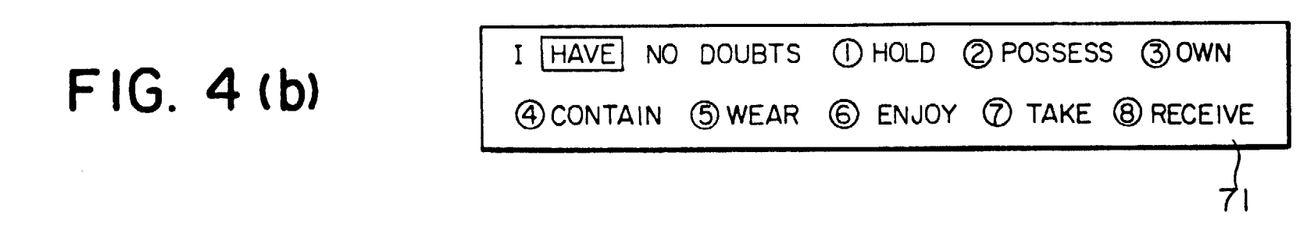

Thus, in the case of "have" of which synonym data is relatively great in quantity, the synonym data is visually represented in a right portion of the upper line and the entirety of the lower line on the LCD 71 as shown in FIG. 4(b), while the data in the text memory 94 is visually represented in the remaining memory display area./ In this example, "have" is displayed with an inversion indicating bit (shown by a broken line for convenience). To the individual synonyms are added serial numbers which are sequential as in the synonym memory 98.

For designating one of the detected synonyms, the user inputs one of the serial numbers. After completion of such designation and word replacement (S39-S45), the visual representation of FIG. 4(a) is resumed with "have" replaced by the designated synonym.

Subsequently, for retrieval of synonyms with regard to "doubts", the selected cursor key 25 is depressed to place the cursor (not shown) at the position of "doubts" (S5, S13-S19). And when the thesaurus key 26 is inputted, the process of synonym retrieval is executed (S8, S20-S38).

After arrival of the control procedure at S28 where "doubts" is decided to be in the upper line, the procedure advances therefrom to S31. Synonyms of "doubts" are less than 40 digits as will be described later, and the display position of "doubts" is within the memory display area not hidden by the visual representation of synonyms, so that the control procedure advances from S2 and S3 to S4 in FIG. 3(a) through S31, S32, S36, S37 and S38.

Figure 4C:
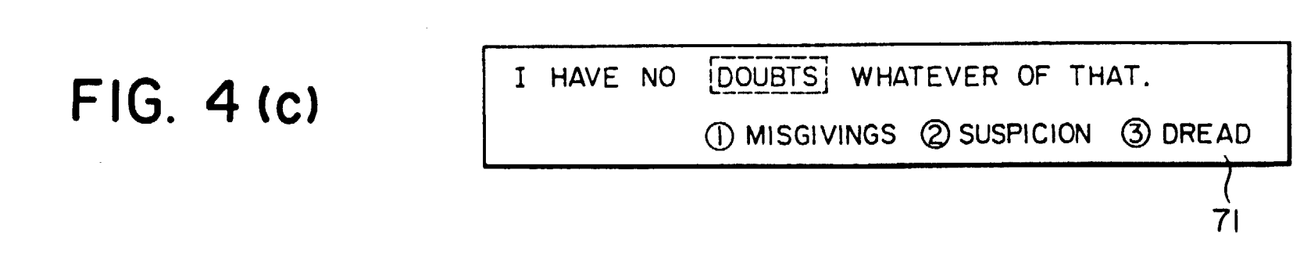

Thus, in the case of "doubts" of which synonym data is relatively small in quantity, the synonym data is visually represented in a right portion of the lower line of the LCD 71 as shown in FIG. 4(c), while the data in the text memory 94 is visually represented in the remaining memory display area. In this example, "doubts" is displayed with an inversion indicating bit (shown by a broken line for convenience). To the individual synonyms are added serial numbers which are sequential as in the synonym memory 98.

For designating one of the detected synonyms, the user inputs one of the serial numbers. After completion of such designation and word replacement (S39-S45), the visual representation of FIG. 4(a) is resumed with "doubts" replaced by the designated synonym.

According to the above system, when the retrieved synonyms are visually represented on the LCD 71, the display area can be automatically adjusted in accordance with the quantity of the synonyms as described hereinabove. And in the remaining area where none of the synonyms is visually represented, it is possible to display and scroll the input data for composing and editing a document as in an ordinary operation. Consequently, the efficiency of using the LCD 71 is remarkably raised to enhance the operational facility of the typewriter despire a small capacity of the LCD 71.

Although the above system is concerned with an exemplary case of retrieving synonyms relative to an input word, the present invention is applicable also to another case of retrieving a candidate word for any misspelt word and replacing the misspelt word with such candidate word. The present invention is further applicable to a case of retrieving and displaying a conjugation (past, pat participle, comparative degree, superlative degree or the like) of an input word in response to a command from the conjugation retrieval key and replacing the input word with such comjugation. Besides the above, the invention is still further applicable to a case of retrieving the meaning (Japanese translation) of an input word in response to a command from the meaning retrieval key and visually representing the meaning thereof in Roman letters.

It is to be noted that application of the data processing system according to the present invention is not limited only to the type which retrieves dictionary information with respect to each input word. For example, data of biographical names, company names and so forth and data of addresses corresponding thereto may be previously stored in a user dictionary and, when any biographical name or companyu name is inputted, the address corresponding thereto may be retrieved and displayed.

The above embodiment is merely an example of applying the present invention to an electronic typewriter. And further application is possible to a word processor of any type as well as to an electronic typewriter equipped with a type-ball printer, a thermal printer, a dot printer or a laser printer.

What is claimed is:

1. A data processing system comprising:
    input means for input data groups, each input data group representing a plurality of characters and symbols;
    display means for visually displaying the input data groups;
    relational data memory means for storing relational data groups related to certain ones of the input data groups;
    designating means for designating one of the input data groups displayed on said display means;
    retrieval means for retrieving those relational data groups stored in said relationship data memory means having a predetermined relationship with the one data group designated by said designating means;
    detecting means for detecting the length of the relational data groups retrieved by said retrieval means; and
    control means for controlling said display means so as to display the relational data groups retrieved by said retrieval means, said control means further automatically controlling a size and a starting point of an area on said display means on which the retrieved relational data groups are displayed, said size and starting point being automatically determined depending upon the length of the retrieved relational data group detected by said detecting means,
    the input data group being displayed in an area of aid display means other than the area on which the retrieved relational data are displayed.

2. The data processing system according to claim 1 wherein said input data groups include a text consisting of words and said relational data groups correspond to synonyms of at least one of said words.

3. The data processing system according to claim 1 wherein said display means is provided with a display screen consisting of two areas and wherein said detecting means comprises first judging means for judging is said length of said relational data groups retrieved by said retrieval means is not more than a capacity of a first area on said display screen.

4. The data processing system according to claim 3 wherein said detecting means further comprises second judging means for judging whether said length of said relational data group retrieved by said retrieval means is not more than 1.5 times of said capacity of the first area on said display screen.

5. The data processing system according to claim 3 wherein, if the length of said retrieved relational data groups detected by said detecting means is not more than said capacity of the first area on said display screen, said retrieved relational data groups are visually represented in the first area on said display screen by said relational data display control means.

6. The data processing system according to claim 4 wherein, if the length of said retrieved relational data groups detected by said detecting means is more than said capacity of the first area on said display screen but not more than 1.5 times thereof, said retrieved relational data groups are visually represented in the full first area and partly in a second area on said display screen in an one end justified stated by said control means.

7. The data processing system according to claim 4 wherein, if the length of said retrieved relational data groups detected by said detecting means exceeds 1.5 times of said capacity of the first area on said display screen, than said retrieved relational data groups are visually represented by a quantity thereof capable of representation in half of the second area in an one end justified state and in the full first area on said display screen by said control means.

8. The data processing system according to claim 1 which further comprises replacing means for replacing said retrieved relational data groups with one of the said input data groups.

9. The data processing system according to claim 8 wherein said replacing means comprises another designate means for designating one of the retrieved relational data groups to replace the data group designated by said designate means.

10. The data processing system according to claim 1 wherein said control means further control said display means to relocate the input data groups so that the one input data group designated by the designating means is not covered by the relational data groups displayed on the display means.

* * * * *